(12) United States Patent
Link et al.

(10) Patent No.: US 7,125,040 B2
(45) Date of Patent: Oct. 24, 2006

(54) METHOD OF ACTIVATING A SAFETY DEVICE

(75) Inventors: Andrea Link, Munich (DE); Willibald Watzka, Aichach (DE); Jan Urbahn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/844,581

(22) Filed: May 13, 2004

(65) Prior Publication Data

US 2005/0006885 A1    Jan. 13, 2005

Related U.S. Application Data

(63) Continuation of application No. PCT/EP02/10660, filed on Sep. 23, 2002.

(30) Foreign Application Priority Data

Nov. 13, 2001 (DE) .................... 101 55 663

(51) Int. Cl.
*B60R 21/16* (2006.01)

(52) U.S. Cl. .................................... 280/735
(58) Field of Classification Search ............ 280/735, 280/734; 180/271, 282; 701/45
See application file for complete search history.

(56) References Cited

U.S. PATENT DOCUMENTS 6,271,747 B1    8/2001    Fendt et al.
6,426,567 B1 *  7/2002    Ugusa et al. ............. 307/10.1

FOREIGN PATENT DOCUMENTS

| DE | 43 24 753 A1 | 3/1994 |
|----|--------------|--------|
| DE | 196 51 123 C1 | 6/1998 |
| DE | 197 40 021 A1 | 3/1999 |
| DE | 199 00 327 A1 | 7/2000 |
| DE | 199 36 819 A1 | 9/2000 |

* cited by examiner

*Primary Examiner*—Faye M. Fleming
(74) *Attorney, Agent, or Firm*—Crowell & Moring LLP

(57) ABSTRACT

The invention relates to a method for activating a safety device, using a first impact sensor for generating a displacement signal which reproduces the movement of the vehicle in a direction of displacement, and a second impact sensor, arranged at a distance from the first impact sensor, for generating a displacement signal which reproduces the movement of the vehicle in the same direction of displacement. A processing device is provided, by which means the two displacement signals or signals derived therefrom can be correlated at the right time, and by which means the safety device is activated according to the predetermined correlations of the two signals.

11 Claims, 1 Drawing Sheet

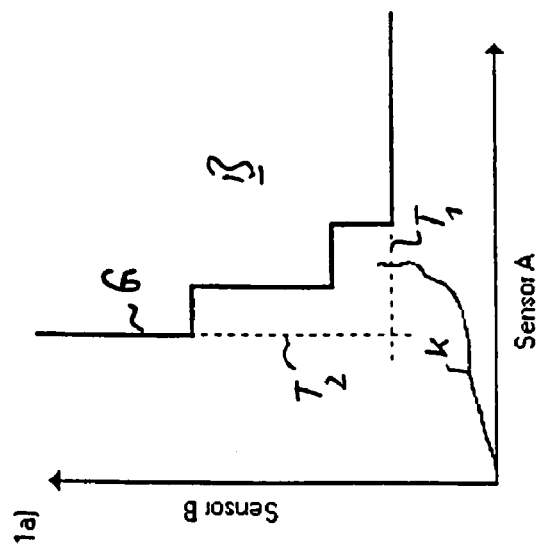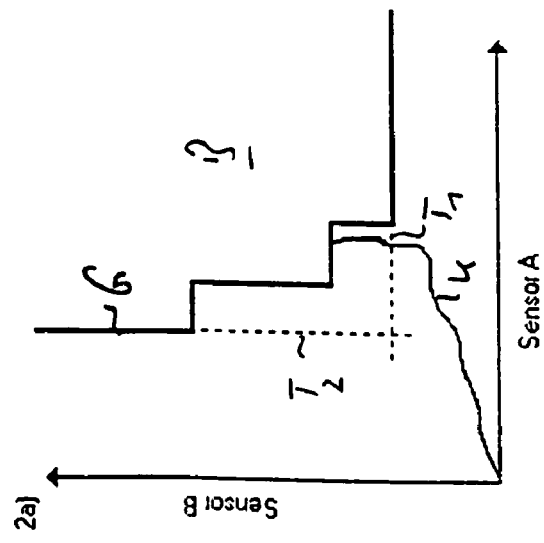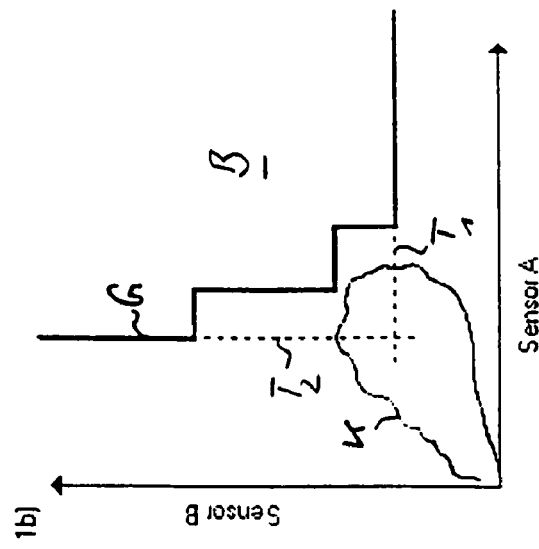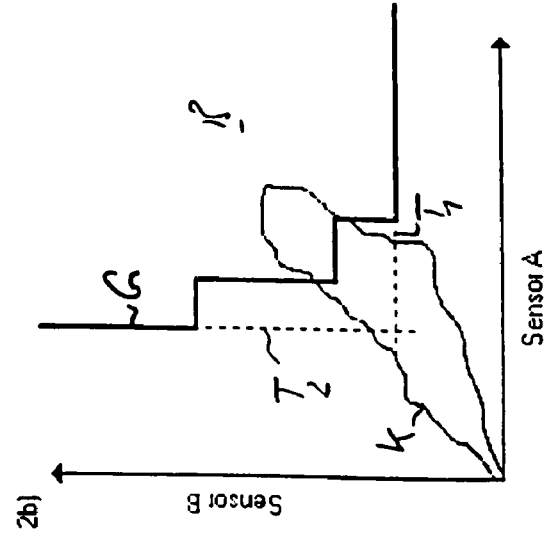

METHOD OF ACTIVATING A SAFETY DEVICE

CROSS REFERENCE TO RELATED APPLICATIONS

This application is a continuation of PCT Application No. PCT/EP02/10660 filed on Sep. 23, 2002, which claims priority to German Application No. 101 55 663.2 filed Nov. 13, 2001.

BACKGROUND AND SUMMARY OF THE INVENTION

The invention relates to a method of activating safety device devices and, more particularly, to a method of operating safety devices such as air bags, belt tighteners, rollover bars, and the like.

Methods of this type are generally known and used in every vehicle. In many cases, an impact sensor is used, which is an acceleration sensor that preferably generates a signal representative of the forward movement or forward deceleration (displacement) of the vehicle. If this sensor signal exceeds a threshold value, a signal is generated which, at a minimum, prepares the activation of the safety device. This signal has to meet several conditions. Measured according to the total duration of a vehicle impact of, for example 30 ms, the signal has to be available at an early point in time. However, the signal also has to be unambiguous. Operating conditions of the vehicle must be unambiguously recognized which are only slightly different with respect to the sensor signal course from an actual impact, but in which the safety device should specifically not be triggered (no-fire situations). One example of such an operating condition that must be recognized is an extreme stressing of the vehicle. Such an extreme stressing may occur during a fast drive over a gravel and/or pothole plagued stretch of a roadway.

It is an object of the invention to provide a method of activating a safety device which, at an early point in time, supplies unambiguous information concerning the actual behavior of the vehicle and the resulting necessity of triggering the safety device or devices.

The invention achieves this object by providing a method of activating a safety device having a first impact sensor for generating a displacement signal reflecting the movement of the vehicle in a direction of displacement, and comprising a second impact sensor arranged away from the first impact sensor for generating a displacement signal reflecting the movement of the vehicle in the same direction of displacement. A processing device is provided by which the two movement signals, or signals derived therefrom, are correlated in a time-correct manner, wherein the safety device is activated according to predetermined correlations of the two signals.

The invention is characterized essentially by the following measures. Two impact sensors are evaluated. The evaluation takes place in an isochronous manner. The sensor signals are related to one another. This relationship of the signals is not rigid, but rather variable with respect to the time and the amount. By means of the amount, for example, the installation-site-caused variation of the reaction times of the sensors are taken into account as is the response behavior of the respective sensor, which is a function of the environment of the installation site and which, in comparison to the other sensor, may also be very different. A sensor which is disposed on a rigid engine mount generates a different signal signature than a sensor which experiences a crash event over a relatively soft "active path".

In accordance with the invention, the sensor signals generated by different sensors are related to one another. "Different" may apply to the difference of the physical parameter (for example, acceleration and pressure) as well as to the mounting site, the response sensitivity, or also the response direction.

Other objects, advantages and novel features of the present invention will become apparent from the following detailed description of the invention when considered in conjunction with the accompanying drawings.

BRIEF DESCRIPTION OF THE DRAWINGS

FIGS. 1a and 1b are diagrams illustrating a "no-fire" situation according to the invention; and FIGS. 2a and 2b are further diagrams illustrating other situations in accordance with the invention.

DETAILED DESCRIPTION OF THE DRAWINGS

With reference to the drawings, one example will be described in detail in the following. The same physical parameter of the acceleration, and the parameter of the deceleration speed derived therefrom by integration, respectively, will be considered for two sensors A and B, which differ with respect to their installation site and their acting direction. For the triggering of a frontal air bag, it is examined how the speed change in the lateral direction of the vehicle (Y-direction, perpendicular to the longitudinal=X-direction) measured at a B-column of the vehicle acts in a time-related manner with respect to the speed change in the longitudinal direction of the vehicle measured in the vehicle center.

In the drawing, the speed changes measured at the two vehicle sites are related to one another in a correct-time manner. In a processing device (not shown), the two movement signals are correlated in a correct-time manner, and a course curve K is obtained therefrom, which curve K permits the obtaining of information concerning the necessity of activating the safety devices.

Four different cases are schematically illustrated in FIGS. 1a, 1b, 2a and 2b.

FIGS. 1a and 1b show the course curves K for so-called "no-fire" crashes. These are accidents in which the safety devices should not be activated. One example is the impact of the vehicle on a soft obstacle at a low speed. In the figures, the solid line G represents the border of the "fire" region B and has a step-wise character as shown. In other words, the border G is identical with trigger-level T2 at high signal values of sensor B and identical with trigger-level T1 for high signal values of sensor A. For mid-size values of both sensor signals A and B, the border G has a stepped transition from T1 to T2. Of course, the sensor signals are correlated in a time correct manner, which "time" dimension is not specifically shown in the two-dimensional figures.

Additional improvements of the invention are not shown: The correlation of the two sensor signals with one another does not take place before one of the signals exceeds a given triggering threshold value. Also, the processing device is deactivated if, or as soon as, one of the two signals falls below its triggering threshold value.

In accordance with the invention, the corresponding safety device(s) can also be activated in the event of a secondary side crash, if required and meaningful, and at the correct time. Such a side crash indicates an abnormal lateral movement of the vehicle after an immediately preceding (that is, primary) abnormal acceleration of the vehicle in the longitudinal direction.

Lateral vibrations frequently occur during a longitudinal crash. Sensors, which respond to lateral movements of the vehicle, supply signals which, when considered separately, would activate safety devices provided for an abnormal lateral movement of the vehicle. In order to activate the corresponding safety devices only when a secondary side crash actually occurs, and also to do so at the correct time, the correlation values relevant to the activation for the triggering of the safety device(s) are changed toward higher values in accordance with an advantageous embodiment of the invention.

If the correlation values are considered as time-variable threshold values which are related to one another, then the significance of this information can be explained in an example. While the corresponding side air bags and additional side safety devices are triggered in the event of a primary lateral load of more than 20 km/h (that is, a side crash at a speed of the penetrating vehicle of more than 20 km/h), during a preceding longitudinal crash the triggering of these side airbags and other side safety devices will take place only at a higher lateral load of, for example, 30 km/h.

As a result, it is possible to trigger the safety devices also in the event of a secondary side crash. The lateral loads which occur during a longitudinal crash but without a side crash are thereby differentiated from those of an actually secondarily occurring side crash, and the safety devices provided for that purpose are activated according to the requirements.

In the case of the invention, the output signals of two crash sensors are fed to the triggering device(s) for the safety device(s). The threshold values relevant to the triggering of the safety device are time-variable with respect to their amount and actually result in a triggering only if they exceed simultaneously defined and also time-variable threshold values, as also illustrated in the drawing (see FIG. 2b).

Instead of this two-dimensional "phase space", the invention can also be expanded to three or more dimensional phase spaces. For this purpose, the output signals of a total of 3 or more impact sensors are isochronously related to one another. A, for example, 3-dimensional crash behavior of the vehicle can be examined by means of another sensor which responds to a movement in the vertical direction. By means of the application of three time-variable thresholds, a cube is designed instead of the "triggering plane" B defined in the two dimensional case of a longitudinal and a lateral sensor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of activating a safety device, the method comprising the acts of:
   generating a displacement signal with a first impact sensor, which displacement signal reflects a movement of the vehicle in a direction of displacement;
   generating a second displacement signal with a second impact sensor, arranged at a location spaced apart from the first impact sensor, which second displacement signal reproduces the movement of the vehicle in the same direction of displacement;
   correlating the first and second displacement signals, or signals derived therefrom, with a processor in a substantially isochronous manner; and
   activating the safety device according to predetermined correlations of the first and second displacement signals.

2. The method according to claim 1, wherein the act of correlating occurs as soon as one of the first and second displacement signals exceeds a given triggering threshold.

3. The method according to claim 1, further comprising the act of deactivating the processor if, or as soon as, one of the first and second displacement signals falls below a given threshold value.

4. The method according to claim 2, further comprising the act of deactivating the processor if, or as soon as, one of the first and second displacement signals falls below a given threshold value.

5. The method according to claim 1, wherein the correlating act uses a derived signal formed by integrating an acceleration signal generated by one of the impact sensors constructed as an acceleration sensor.

6. The method according to claim 2, wherein the correlating act uses a derived signal formed by integrating an acceleration signal generated by one of the impact sensors constructed as an acceleration sensor.

7. The method according to claim 3, wherein the correlating act uses a derived signal formed by integrating an acceleration signal generated by one of the impact sensors constructed as an acceleration sensor.

8. The method according to claim 1, wherein lateral displacement of the vehicle is detected by the first and second impact sensors, and further wherein in an event of an immediately preceding abnormal acceleration of the vehicle in a longitudinal direction, correlation values relevant to the activation of the safety device are changed.

9. The method according to claim 2, wherein lateral displacement of the vehicle is detected by the first and second impact sensors, and further wherein in an event of an immediately preceding abnormal acceleration of the vehicle in a longitudinal direction, correlation values relevant to the activation of the safety device are changed.

10. The method according to claim 3, wherein lateral displacement of the vehicle is detected by the first and second impact sensors, and further wherein in an event of an immediately preceding abnormal acceleration of the vehicle in a longitudinal direction, correlation values relevant to the activation of the safety device are changed.

11. The method according to claim 5, wherein lateral displacement of the vehicle is detected by the first and second impact sensors, and further wherein in an event of an immediately preceding abnormal acceleration of the vehicle in a longitudinal direction, correlation values relevant to the activation of the safety device are changed.

* * * * *